June 10, 1924.

H. A. PETREQUIN

COMBINED AUTOMATIC VALVE AND HOSE COUPLING

Filed April 9, 1923

1,497,283

Inventor
Harry A. Petrequin
By S. E. Thomas
Attorney

Patented June 10, 1924.

1,497,283

UNITED STATES PATENT OFFICE.

HARRY A. PETREQUIN, OF DETROIT, MICHIGAN.

COMBINED AUTOMATIC VALVE AND HOSE COUPLING.

Application filed April 9, 1923. Serial No. 630,699.

*To all whom it may concern:*

Be it known that I, HARRY A. PETREQUIN, citizen of the United States, residing at Detroit, county of Wayne, State of Michigan, have invented a certain new and useful Improvement in Combined Automatic Valves and Hose Couplings, and declare the following to be a full, clear, and exact description of the same, such as will enable others skilled in the art to which it pertains to make and use the same, reference being had to the accompanying drawings, which form a part of this specification.

My invention relates to a combined hose coupling and automatic shut-off valve, shown in the accompanying drawings and more particularly described in the following specification and claim.

This invention is especially designed for use in connection with air-pipe lines as installed in shops or factories for the operation of pneumatic hammers, drills or other compressed air driven tools. It may however be employed for connecting hose with water-supply pipes.

The primary object of this invention is to provide means whereby a hose may be quickly coupled to an air line and by the act of coupling open a valve permitting the air to pass through to a hose and thence to a pneumatically operated tool; the arrangement being such that upon disconnecting the hose from the pipe line the valve will automatically close against the escape of air from the pipe line.

A further object of the invention is to provide a simple device, inexpensive to manufacture and not liable to get out of order.

With the foregoing and other objects in view which will appear as the description proceeds the invention further resides in the combination and arrangement of parts and in the details of construction hereinafter described and claimed it being understood that changes may be made in the precise embodiment of the invention herein disclosed.

In the drawings accompanying this specification:

Figure 1:
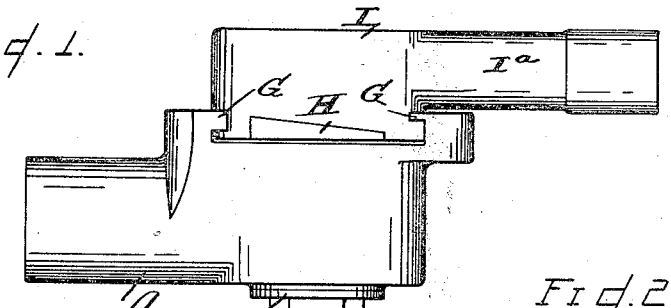
Figure 1 is a side elevation of the device showing the co-operating coupling elements as they would appear when about to be interlocked.
Figure 2:
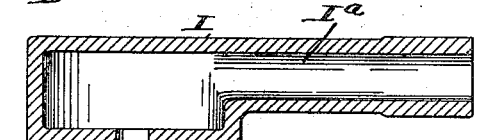
Figure 2 is a longitudinal sectional view through the fitting to be secured to a hose—not shown.
Figure 3:
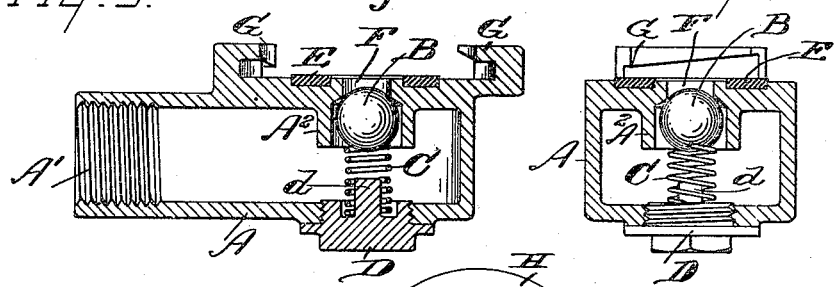
Figure 3 is a similar horizontal sectional view through the fitting to be connected with a pipe line,—not shown,—indicating the valve as it would appear when seated.
Figure 4:
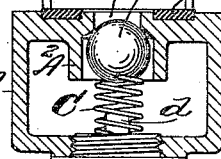
Figure 4 is a cross-sectional view through the valve seat of the pipe fitting, showing in elevation one of its overlapping inclined flanges for receiving the inclined rims of the co-acting hose coupling element.
Figure 5:
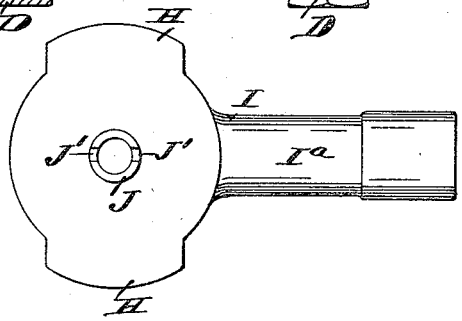
Figure 5 is an elevation of the hose fitting looking toward the end of the annular projecting nipple by which the ball-valve is unseated when the coupling elements are interlocked.
Figure 6:
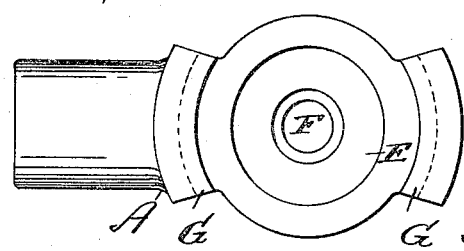
Figure 6 is an elevation of the pipe line fitting showing the over-lapping fan-shaped flanges with which the inclined fan-shaped rims of the co-acting element interlock.

Referring now to the letters of reference placed upon the drawings:

A denotes a fitting tapped at $A^1$ to engage the threaded end of a pipe line—not shown.

B is a ball-valve lodged in an annular inwardly projecting flange $A^2$ integral with the wall of the fitting and surrounding the valve seat.

C is a coiled spring mounted upon the inwardly projecting stem $d$, of a cap nut D, screwed into the wall of the fitting directly opposite the valve seat,—the spring being adapted to bear upon the valve B to hold it normally upon its seat.

E is a rubber gasket lodged in an annular recess surrounding the port F.

G, G, are inclined overlapping rim flanges spaced from the face of the fitting A to receive the projecting inclined rims H, H, of the co-acting hose fitting I, whereby the respective coupling elements may be interlocked.

Projecting from the flat surface of the chambered portion of the fitting I, is an annular nipple J, adapted to force the valve B from its seat upon coupling the respective fittings together. The nipple J is slotted as indicated at $J^1 J^1$ for the passage of air or fluid through the annular stem $I^a$ of the fitting to a hose—not shown.

Having now indicated the several parts by reference letters the construction and operation of the device will be readily understood.

It is customary in shops employing pneumatic tools to provide a plurality of downwardly directed pipes at suitable intersections respectively connected with an air-tank or other source of air supply maintained under pressure.

In putting my device into use these several pipe lines are respectively provided with the fittings A carrying the automatic closing valves B, thereby holding the air against escape. When the operator desires to actuate a pneumatic tool he establishes a connection between the compressed air tank (not shown) and the tool, by coupling the fitting I attached by a hose to the tool with the co-acting fitting A, carried by the pipe line. The nipple J upon encountering the valve forces the latter from its seat, the fitting I is then given a slight rotation locking the inclined fan-shaped rims and flanges of the respective coupling elements together, thus permitting the air to pass from the pipe line to the tool.

When it is desired to disconnect the tool from pipe lines, a reverse operation of the fitting I will release it from the fitting attached to the pipe line whereupon the ball-valve B will automatically return to its seat under pressure of air and the action of the spring C, thus closing the valve against escape of air.

If it should be necessary to remove the ball-valve or the spring the same may be readily accomplished by the removal of the nut D from the wall of the fitting A, whereupon other parts may be installed and the nut replaced.

I claim:

In a device of the character described, a chambered fitting adapted for connection with a supply pipe-line having projecting fan-shaped tapering flanges spaced from the wall of the chambered portion of the fitting, a valve housed within the chambered fitting adapted to close a discharge orifice through the wall of the fitting, a gasket surrounding the discharge orifice lodged in an annular recess formed in the wall of said fitting, an inwardly directed annular rim surrounding the discharge orifice integral with the wall of the fitting, a removable plug screwed into the wall of the fitting provided with an inwardly directed stem, a spring supported by the stem adapted to engage the valve to force it to its seat and a co-acting fitting adapted for attachment to a hose line and having projecting fan-shaped tapering rims adapted to interlock with the flanges of the first named fitting and provided also with a projecting nipple adapted to engage the valve to force it from its seat against the action of the spring upon coupling the respective fittings together, whereby air or fluid under pressure may pass from the supply pipe to the hose line.

In testimony whereof, I sign this specification in the presence of two witnesses.

HARRY A. PETREQUIN.

Witnesses:
 S. E. THOMAS,
 MAURICE WOLF.